(12) United States Patent
Oizumi (10) Patent No.: US 7,821,532 B2
(45) Date of Patent: Oct. 26, 2010

(54) IMAGE GENERATING APPARATUS FOR VEHICLES AND METHOD OF THE SAME

(75) Inventor: Ken Oizumi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 835 days.

(21) Appl. No.: 11/410,977

(22) Filed: Apr. 26, 2006

(65) Prior Publication Data

US 2006/0244844 A1 Nov. 2, 2006

(30) Foreign Application Priority Data

Apr. 27, 2005 (JP) .............................. 2005-128868

(51) Int. Cl.
- H04N 7/18 (2006.01)
- H04N 5/228 (2006.01)
- H04N 5/235 (2006.01)
- H04N 5/222 (2006.01)
- G06K 9/40 (2006.01)
- G06K 9/32 (2006.01)

(52) U.S. Cl. ................. 348/148; 348/222.1; 348/229.1; 348/333.01; 382/274; 382/293

(58) Field of Classification Search ................. 348/118, 348/229.1, 333.01, 148, 207.1, 207.11, 207.99, 348/222.1, 230.1; 382/274, 293
See application file for complete search history.

(56) References Cited

U.S. PATENT DOCUMENTS 6,806,903 B1 * 10/2004 Okisu et al. .................. 348/254

7,027,665 B1 * 4/2006 Kagle et al. .................. 382/284
7,158,173 B2 1/2007 Lee et al.
2003/0081133 A1 * 5/2003 Lee et al. .................. 348/229.1
2006/0017597 A1 1/2006 Jaspers

FOREIGN PATENT DOCUMENTS

| CN | 1547074 A | 11/2004 |
|---|---|---|
| JP | 2004-155395 A | 6/2004 |
| KR | 1999-0053690 B1 | 7/1999 |
| KR | 2003-0035400 B1 | 5/2003 |
| KR | 2003-0081649 B1 | 10/2003 |

OTHER PUBLICATIONS

K. Yamada et al., "A Method for Dynamic Range Expansion of TV Cameras for Vehicles," Systems and Computers in Japan, vol. 27, No. 13, Nov. 30, 1996, pp. 49-61.

* cited by examiner

Primary Examiner—David L Ometz
Assistant Examiner—Richard M Bemben
(74) Attorney, Agent, or Firm—Foley & Lardner LLP (57) ABSTRACT

An image generating apparatus for a vehicle which includes: a camera; a brightness adjusting device which adjusts brightness of pixel data obtained by encoding a video signal from the camera; a rearranging device that rearranges the pixel data; and a control device that controls the brightness adjusting device, wherein the brightness adjusting device is controlled to adjust the brightness of the pixel data based on brightness of the pixel data which have been or to be rearranged by the rearranging device.

16 Claims, 5 Drawing Sheets

FIG. 6

IMAGE GENERATING APPARATUS FOR VEHICLES AND METHOD OF THE SAME

BACKGROUND OF THE INVENTION

1. Field of the Invention

The present invention relates to an image generating apparatus for vehicles, which presents a driver with an image of areas around his/her vehicle. And the present invention relates to a method of generating an image of areas around a vehicle to be displayed to a driver.

2. Description of the Related Art

Japanese Patent Application Laid-Open Publication No. 2004-155395 discloses an image generating apparatus that stores an image inputted from a camera with an AGC (Auto Gain Control) function in an input frame buffer and rearranges pixel data in the input frame buffer to generate an output image. Brightness of the image inputted from the camera is automatically adjusted by the AGC function of the camera.

SUMMARY OF THE INVENTION

In generating an output image using a part of the input image by the aforementioned image generating apparatus, the brightness of the image adjusted by the AGC function of the camera is not always appropriate for the output image. Namely, there is a case in which the brightness of the output image is too light or dark as a whole. Particularly, when a plurality of output images are generated from one input image, the AGC function cannot be operated for each output image, thus causing difficulty in unifying the brightness of the entire output images.

Also, in the apparatus that stores images, which are captured by a plurality of cameras each having an AGC function, in the input frame buffer and rearranges pixel data in the input frame buffer to generate an output image, there is a problem in which brightness levels of the images adjusted by the AGC functions of the respective cameras differ depending on the difference in an area of field of view of each camera to cause a difference in brightness levels between the images captured by the respective cameras in combining the images captured by the respective cameras.

In order to solve this problem, a method is considered in which information of the AGC function is exchanged between the cameras through communications, however, this causes a problem in which the camera needs to have an additional function making the structure thereof complex.

An object of the present invention is to provide an image generating; apparatus for a vehicle and a method of the same that solve the aforementioned problems to enable to obtain an output image with a suitable brightness.

An aspect of the present invention is an image generating apparatus for a vehicle comprising: a camera; a brightness adjusting device which adjusts brightness of pixel data obtained by encoding a video signal from the camera; a rearranging device that rearranges the pixel data; and a control device that controls the brightness adjusting device, wherein the brightness adjusting device is controlled to adjust the brightness of the pixel data based on brightness of the pixel data which have been or to be rearranged by the rearranging device.

BRIEF DESCRIPTION OF THE DRAWINGS

The invention will now be described with reference to the accompanying drawings wherein.

DETAILED DESCRIPTION OF THE PREFERRED EMBODIMENT

Embodiments of the present invention will be explained below with reference to the drawings, wherein like members are designated by like reference characters.

First Embodiment

<Entire Structure of Apparatus>

Figure 1:
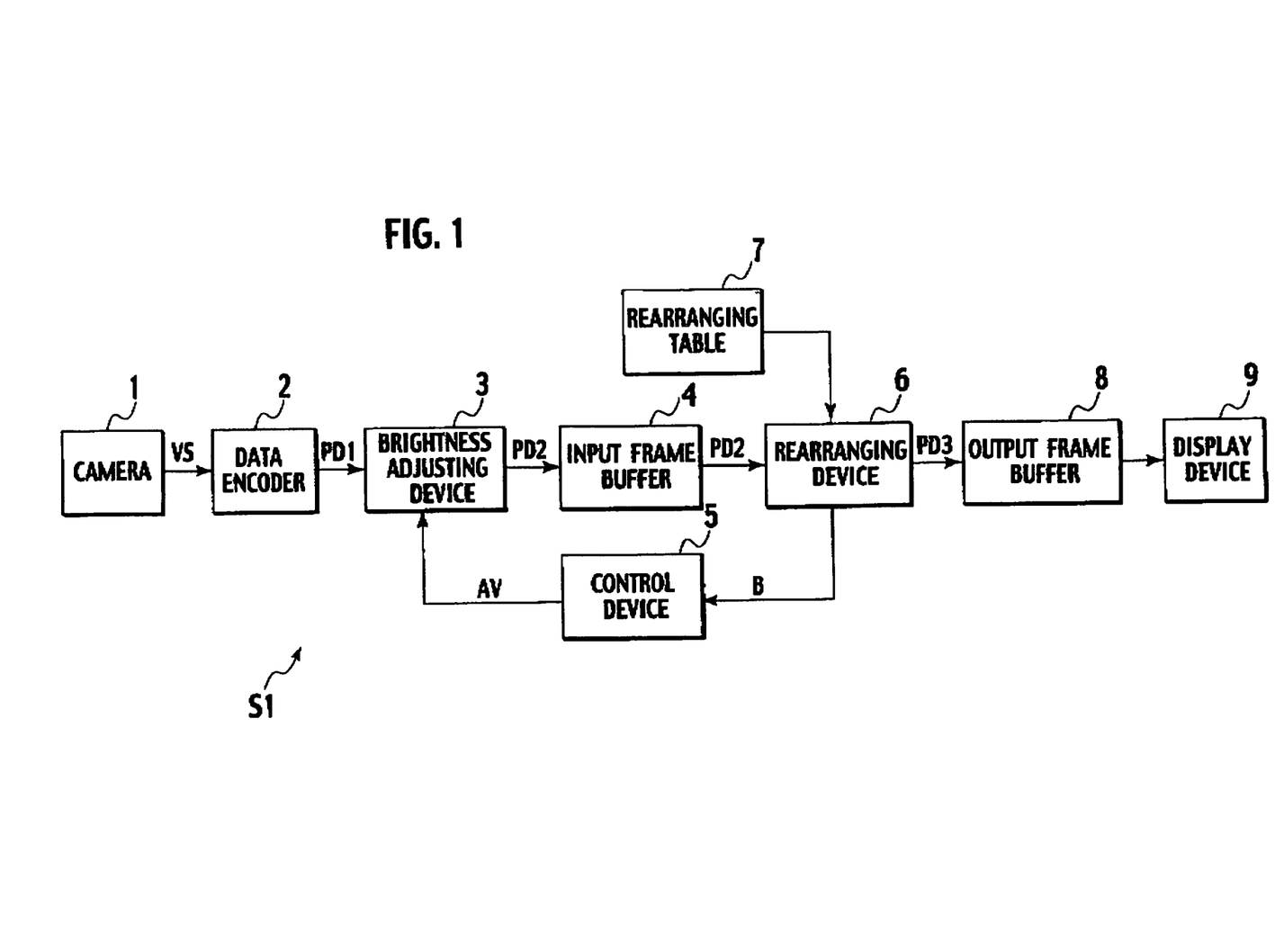
FIG. 1 is a block diagram of an image generating apparatus for a vehicle according to a first embodiment of the present invention.

As illustrated in FIG. 1, an image generating apparatus for a vehicle S1 according to a first embodiment of the present invention includes a camera 1, a data encoder 2, a brightness adjusting device 3, an input frame buffer 4, a control device 5, a rearranging device 6, a rearranging table 7, an output frame buffer 8, and a display device 9.

A data flow and a main operation of the apparatus will be first explained and an operation of the control device S will be explained thereafter.

<Data Flow and Main Operation of Apparatus>

The camera 1 is an electronic camera which is attached to a vehicle and shoots images of an area around a vehicle. The camera 1 has an AGC (Auto Gain Control) function by which brightness of a video signal VS is adjusted in response to brightness of an imaging object in its imaging range.

The video signal VS inputted from the camera 1 is entered into the data encoder 2 by a transmission scheme such as an NTSC (National Television System Committee). The data encoder 2 encodes the input video signal VS in accordance with resolution and a color depth of the input frame buffer 4 to generate pixel data PD1, and sequentially outputs the generated pixel data PD1 to the brightness adjusting device 3.

The brightness adjusting device 3 processes the pixel data PD1 which are encoded by the data encoder 2, based on an adjusted value AV sent to the brightness adjusting device 3 from the control device 5, and stores the processed pixel data, serving as pixel data PD2, in the input frame buffer 4.

The adjusted value AV sent to the brightness adjusting device 3 from the control device 5 is updated for each frame and affects the whole pixels in the frame. The operation of the control device 5 will be explained later using a specific example.

The adjusted value AV indicates a ratio for correcting pixel brightness. Suppose that a ratio of brightness to a pre-adjusted brightness value is expressed by percentage. When the adjusted value AV is 50%, the pixel brightness is reduced to half. When the adjusted value AV is 100%, the pixel brightness stays as it is. And when the adjusted value AV is 150%, the pixel brightness is increased by 50%.

The adjusted value AV at the time when the image generating apparatus S1 is started to operate (initial value) is 100% and thereafter the control device 5 overwrites the adjusted value AV with its output data for each frame. When the data encoder 2 encodes the video signal VS in such a manner that the video signal VS is divided into a color-difference signal and a brightness signal, only the brightness signal may be manipulated, and when the data encoder 2 encodes the video signal VS in such a manner that the video signal VS is divided into R, G, and B, the same manipulation is applied to each data of R, G, and B, thereby making it possible to change the pixel brightness. This correction is hereinafter referred to as a variable correction.

Moreover, there is a case in which a fixed correction is applied to the input image or each pixel of the input image. For example, there is a case in which a phenomenon is electronically corrected where the center of the frame is brightly shot and its edge is darkly shot due to a drop in light quantity in the lens periphery. Since shading data, indicative of the drop in the light quality in the lens periphery, is a characteristic value specific to the lens, the relevant correction value is unchanged and fixed even if brightness of the input image is changed by the AGC function of the camera 1. The fixed correction corrects the pixel brightness, similar to the variable correction. Each pixel may have a unique correction value (for example, 120%) corresponding to its position. Alternatively, a correction value obtained by calculation may be applied to each pixel. The fixed correction is performed independently of the variable correction. With respect to the order of the correction, the fixed correction may be performed after the variable correction or the variable correction may be performed after the fixed correction. For example, when the fixed correction is 120% and the variable correction is 150%, a correction of 180% is applied to a certain pixel.

In other words, the brightness adjusting device 3 has two kinds of independent correction functions including the fixed brightness correction corresponding to the pixel position of the input image and the variable brightness correction based on the adjusted value AV from the control device 5, and the brightness of pixel data PD1 generated by the data encoder 2 is changed by the relevant correction function to store corrected pixel data PD2 in the input frame buffer 4.

The rearranging device 6 rearranges the pixel data PD2 in the input frame buffer 4 using the rearranging table 7 and stores the rearranged pixel data, serving as pixel data PD3, in the output frame buffer 8. The rearranging table 7 is an aggregate of information indicating to which pixel in the input frame buffer 4 each pixel of a displaying area in the output frame buffer 8 corresponds. The rearranging device 6 sums up the brightness of the pixel data PD2 used in rearrangement every time when access is made to the input frame buffer 4. When the pixel data PD3 of the entire pixels of the output image in the output frame buffer 8 is obtained, an average value is calculated. The average value is one that indicates the brightness of the pixel data PD3 rearranged in the output frame buffer 8 and the average value is used as brightness data B of the output image.

There is a case in which access to the same pixel in the input frame buffer 4 is made multiple times depending on the rearranging table 7, in which case brightness is added according to the number of access times.

This makes it possible to measure the brightness of the output image generated from the pixel data PD3 stored in the output frame buffer 8. The measured brightness data B of the output image is outputted to the control device 5. As the brightness data B to be outputted to the control device 5, the average value of the brightness of multiple pixel data PD2 used in a rearranging process in the input frame buffer 4 as well as the average value of the brightness of pixel data PD3 in the output frame buffer 8 can be adopted.

The brightness data B in this case is measured by summing up the brightness of pixel data PD2 used in the rearrangement. Each of the brightness of pixel data PD2 is added only once, even if access to the same pixel in the input frame buffer 4 is made multiple times.

Figure 2:
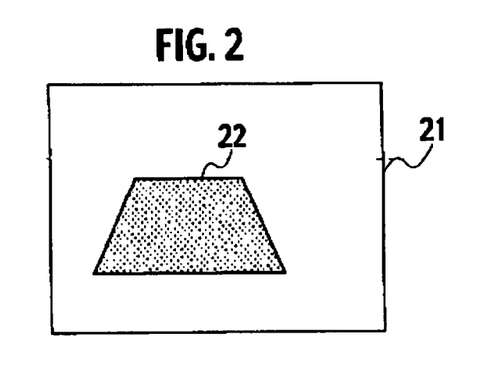
FIG. 2 illustrates an example showing an input image and an area of the input image to be used by a rearranging device according to the first embodiment of the present invention.
Figure 3:
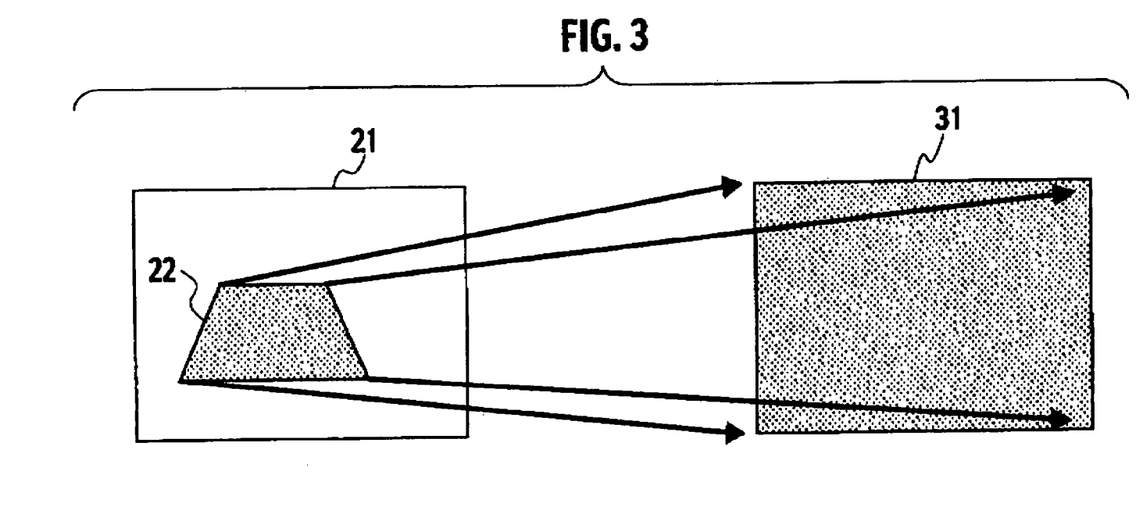
FIG. 3 illustrates an example in which a trapezoidal area of the input image shown in FIG. 2 is transformed to a rectangular output image according to the first embodiment of the present invention.

Namely, for example, when the pixel data PD2 of a trapezoidal area 22 in an input image 21 as shown in FIG. 2 is rearranged in the output frame buffer 8 by the rearranging device 6 to obtain a rectangular output image 31 as shown in FIG. 3, one pixel of the trapezoidal area 22 is sometimes treated as two pixels in the output image in order to expand and deform the trapezoidal area 22 to the shape of the output image 31, in which case brightness for not two pixels but only the original one pixel is added in summing up the brightness of the pixel data PD2 used in the rearrangement.

A proportional relation, which is defined by the rearranging table 7, is established between the average value of the brightness of multiple pixel data PD2 in the input frame buffer 4 used in the rearranging process and the average value of the brightness of pixel data PD3 in the output frame buffer 8 (brightness data of the output image). When the proportional relation is fixed, the same adjusted value AV can be generated by the control device 5 whichever value is used as brightness data B. Since the use of brightness data of the output image as brightness data B is easier, the brightness data of the output image is used as brightness data B in this embodiment.

The display device 9 generates an output image from the pixel data PD3 in the output frame buffer 8 and displays the generated output image toga driver.

<Internal Operation of Control Device 5>

Next, an explanation of an internal operation of the control device 5 will be given using FIGS. 2 and 3.

In the input image 21 illustrated in FIG. 2, the area 22 to be used by the rearranging device 6 is decided by the contents of the rearranging table 7. The following will explain an example of the simple rearranging table 7 when the area 22 is expanded and deformed to generate the output image 31 as illustrated in FIG. 3.

The contents of the input image 21 are indefinite and a brightness distribution of the respective pixels of the input image is not uniform. In almost all the cases, the brightness of the entire input image 21 and that of the area 22 are not the same.

The camera 1 adjusts brightness of the video signal to optimize the brightness of the frame seen as a whole, and outputs the result, though the optimized state may vary depending on the AGC function setting. One example of the simplest AGC functions is that the brightness of the video signal is adjusted in the range of, for example, ±25% in order that the brightness of the entire output image (average value of brightness of all the pixels of the image) is brought close to 50 when the brightness of the pixel of the output image is expressed by 0 to 100.

As mentioned above, an imaging object of the camera 1 is indefinite and a brightness distribution of pixels in a shot image is not uniform. Accordingly, in almost all the cases, the correction which is optimal when the frame is seen as a whole, is not appropriate to the area 22. As illustrated in FIG. 3, when the pixel data of the trapezoidal area 22 are rearranged to the pixels corresponding to the rectangular output image 31, the pixel data of the area 22 are-not uniformly used at the same frequency. Namely, there is a case in which a certain pixel of the input image 21 corresponds to one pixel of the output image 31 but another certain pixel of the input image 21 corresponds to two pixels of the output image 31. Furthermore, in the area 22, a brightness distribution of pixels is not uniform. Accordingly, an average value of brightness of the pixels in the area 22 does not coincide with the brightness data of the output image.

As mentioned above, it is shown that the brightness of a camera image, adjusted within the camera 1 and received by the data encoder 2, is unsuitable for the brightness of the output image generated from the pixel data in the output frame buffer 8. In the present embodiment, in order to optimize the brightness of the output image, the average value of the brightness of the respective pixel data PD3 in the output frame buffer 8 (brightness data of the output image) is measured and fed back-to a brightness adjustment device 3.

Brightness data B of the output image outputted from the rearranging device 6 is inputted to the control device S. For example, when brightness data B of the output image is 36 (since a large bright area exists in the area excepting the area 22 of the input image 21, the area 22 becomes relatively darker by the AGC function of the camera 1, with the result that the output image becomes darker), the control device 5 controls such control that brightness data B of the output image comes close to 50 (target value). Brightness of the input image may be increased in order to enhance the brightness of the output image.

A brightness change range is obtained by dividing target value of brightness data by brightness data of current output image. Here, the target value of brightness data is 50 and the brightness data of current output image is 36. The brightness change range results in 1.39 (=50/36) and the output of the control device 5 (adjusted value AV) results in 139%. Then, upon reception of an output of the control device 5, the brightness adjusting device 3 changes the variable correction value and increases the brightness of the pixel data PD 2 to be written in the input frame buffer 4 to 139%.

As mentioned above, the brightness adjusting device 3 corrects the brightness of the entire frame based on the brightness data of the output image output by the rearranging device 3 according to the pixel area displayed by the display device 9. This makes it possible to set the brightness of the above pixel area as a target value, to maintain the brightness of the image displayed by the display device 9 suitable and to improve image viewability. This eliminates the need for additionally providing a brightness adjusting device corresponding to the pixel area to be displayed after rearranging, excepting the brightness adjusting device 3 which the camera 1 originally includes, thereby making the apparatus simple.

As explained above, according to the image generating apparatus $1 of the present embodiment, in the image generating apparatus in which specific pixels of the image captured by the camera 1 are rearranged by the rearranging device 6 and displayed, the image generating apparatus S1 includes the brightness adjusting device 3, which processes the pixel data PD1 obtained by encoding the video signal VS inputted from the camera 1, and the control device 5, which controls the brightness adjusting device 3, and the control device 5 is configured to control the brightness adjusting device 3 based on the brightness of data rearranged by the rearranging device 6.

Moreover, according to the image generating method for a vehicle of the present embodiment, in the image generating method in which specific pixels of the image captured by the camera 1 are rearranged by the rearranging device 6 and displayed, the brightness adjusting device 3, which processes the pixel data PD1 obtained by encoding the video signal VS inputted from the camera 1, is controlled by the control device 5 based on the brightness of data rearranged by the rearranging device 6.

Furthermore, the image generating apparatus S1 of the present embodiment includes the camera 1 having the AGC function, the input frame buffer 4, which stores the image captured by the camera 1, the data encoder 2, which generates data to be stored in the input frame buffer 4 from the video signal VS from the camera 1, the brightness adjusting device 3, which changes the brightness of data generated by the data encoder 2, the control device 5, which controls the brightness adjusting device 3, the rearranging device 6, which rearranges pixel data PD2 of the input frame buffer 4, the output frame buffer 8, which stores the result of the rearranging device 6, and the display device 9, which displays the contents of the output frame buffer 8, wherein the control device 5 controls the brightness adjusting device 3 based on the brightness of data rearranged by the rearranging device 6.

This structure makes it possible to obtain an output image with a suitable brightness even when an output image is generated using a part of the image inputted from the camera Moreover, taken as an input to the control device 5, is the average value of the brightness of multiple pixel data PD3 of the output image generated in the output frame buffer 8. According to this structure, since the control device 5 operates based on the brightness data of the output image generated in the output frame buffer 8, it is possible to more easily make a suitable brightness adjustment.

Alternatively, taken as an input to the control device 5, may be the average value of the brightness of multiple pixel data PD2, which are used for rearrangement by the rearranging device 6 and which are in the input frame buffer 4. According to this structure, since the control device 5 operates based on the average value of the brightness of multiple pixel data PD2 in the input frame buffer 4 which are used for rearranging by the rearranging device 6, it is possible to make a suitable brightness adjustment.

Moreover, the brightness adjusting device 3 has two kinds of independent correction functions including the fixed brightness correction to the position of the pixel and the variable brightness correction based on an instruction from the control device 5. The pixel data corrected by the relevant correction functions are stored in the input frame buffer 4. According to this structure, the brightness adjusting device 3 can make a suitable brightness adjustment using both the variable brightness correction based on instructions from the control device 5 and the fixed brightness correction.

Additionally, the rearranging device 6 has a function of measuring brightness data of the image generated in the output frame buffer 8. According to this structure, since the rearranging device 6 measures brightness data of the output image generated in the output frame buffer 8, both pixel data rearrangement and brightness measurement can be simultaneously carried opt to make it possible to efficiently measure the brightness data of the output image.

Furthermore, the rearranging device 6 can have a function of measuring the average brightness of multiple pixel data PD2 used for rearranging in the input frame buffer 4. According to this structure, both pixel data rearrangement and brightness measurement can be simultaneously carried out to make it possible to efficiently measure the average value of the brightness of multiple pixel data PD2 used for rearranging in the input frame buffer 4.

Second Embodiment

<Entire Structure of Apparatus>

Figure 4:
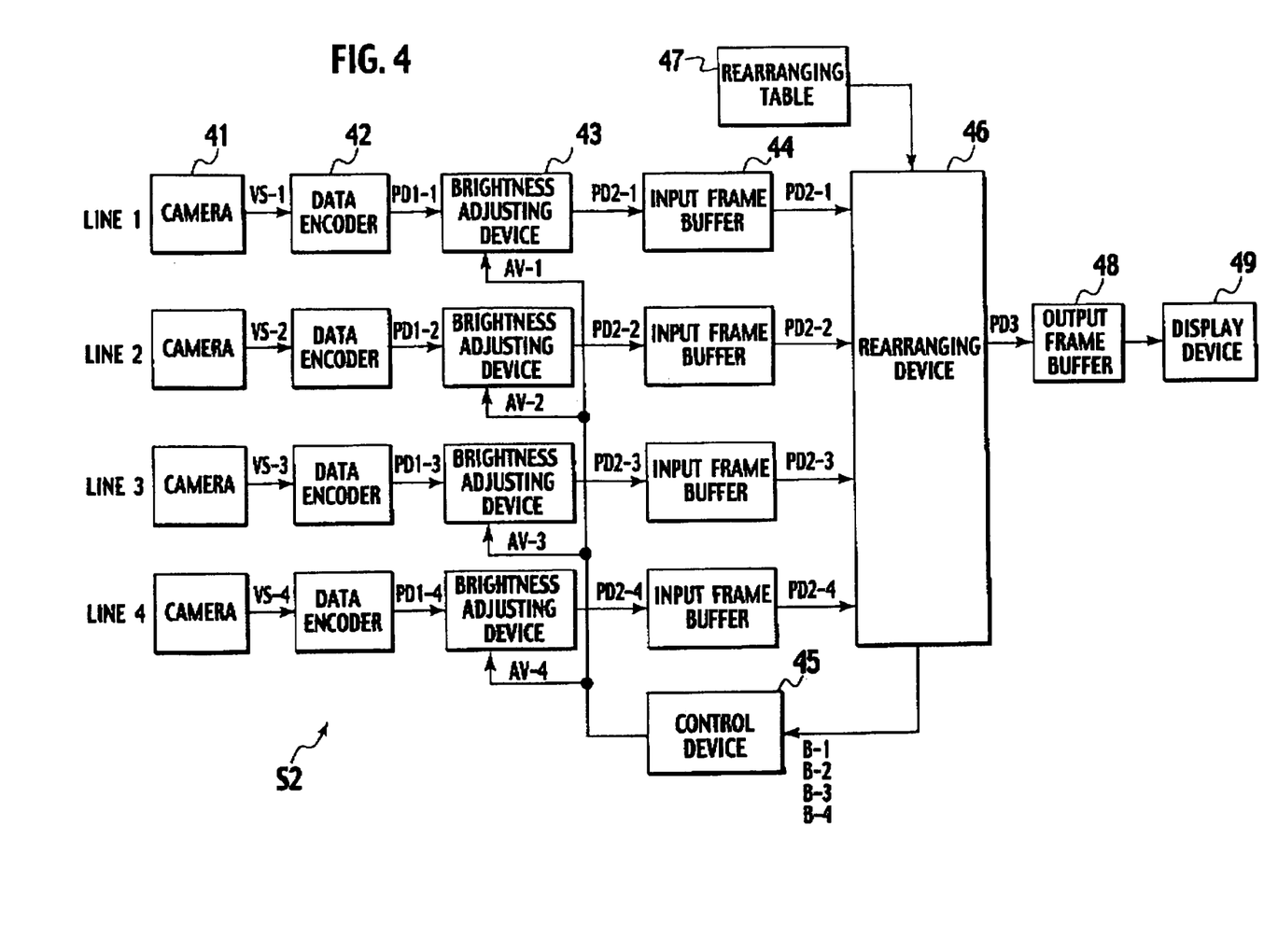
FIG. 4 is a block diagram of an image generating apparatus for a vehicle according to a second embodiment of the present invention.

As illustrated in FIG. 4, an image generating apparatus for a vehicle S2 according to a second embodiment of the present invention includes a plurality of cameras 41, a plurality of data encoders 42, a plurality of brightness adjusting devices 43, a plurality of input frame buffers 44, a control device 45, a rearranging device 46, a rearranging table 47, an output frame buffer 48, and a display device 49.

Data flows and main operations of the apparatus will be first explained and an internal operation of the control device 45 will be thereafter exampled.

<Data Flows and Main Operations of Apparatus>

With respect to the operation in which outputs from the camera 41 are stored in the input frame buffer 44 through the data encoder 42 and the brightness adjusting device 43, respectively, the second embodiment is the same as the first embodiment. A difference between the first embodiment and the second embodiment lies in the following points. First, a plurality of sets of a camera 41, an encoder 42, a brightness adjusting device 43, and an input frame buffer 44 are provided. Secondly, data which flow through respective paths are inputted to the rearranging device 46 in parallel. Thirdly, the control device 45 collectively controls the plurality of brightness adjusting devices 43. Note that although four sets of a camera 41, an encoder 42, a brightness adjusting device 43, and an input frame buffer 44 are described in FIG. 4, any number of sets may be possible if two or more sets are provided. These sets are called as line 1, line 2, line 3, and line 4, respectively. For the purpose of explanation, the camera 41, the data encoder 42, the brightness adjusting device 43 and the input frame buffer 44 of each line are distinguished from one another by adding a line number to the reference number of each component such as camera 41-1, data encoder 42-4 and so forth.

The rearranging device 46 rearranges pixel data PD2-1 to PD2-4 in the multiple input frame buffers 44 using the rearranging table 47, and stores them as pixel data PD3 in the output frame buffer 48. The rearranging table 47 is an aggregate of information indicating to which pixel in the multiple input frame buffers 44 each pixel of a displaying area in the output frame buffer 48 corresponds. As compared with the first embodiment, there is no change in the basic rule of rearrangement, and the only change is in that the capacity of the input frame buffer 44 is increased.

Pixel data PD2-1 to PD2-4 in the multiple input frame buffers 44 are rearranged in the output frame buffers 48 by the rearranging device 46 to generate an output image. Moreover, in rearranging the pixel data PD2-1 to PD2-4, brightness of pixel-data PD2-1 to PD2-4 used for rearranging is separately summed up for each line, and when pixel data PD3 of all pixels of the output image in the output frame buffer 48 is obtained, an average value of brightness is calculated for each line. Each value is an average value of the brightness of a pixel area of the pixel data PD3 rearranged in the output frame buffer 48, each of the pixel area corresponding to each line. These values are referred to as brightness data B-1 to B-4 of the respective lines. The rearranging device 46 outputs these brightness data B-1 to B-4 to the control device 45.

The display device 49 generates an output image from the pixel data PD3 in the output frame buffer 48 and displays the generated output image to the driver.

<Internal Operation of Control Device 45>

Next, an explanation of an internal operation of the control device 45 will be given.

Brightness data B-1 to B-4 is inputted to the control device 45 from the rearranging device 46. Similar to the first embodiment, a brightness adjusted value AV for each line is obtained from a ratio between a target value of brightness data and each of the brightness data B-1 to B-4 of a current output image. In this case, four adjusted values AV-1 to AV-4 are obtained. The control device 45 outputs each of the adjusted values AV-1 to AV-4 to the brightness adjusting device 43 of each line. The brightness adjusting device 43 of each line adjusts the brightness of the pixel data PD1-1 to PD-4 obtained by encoding the video signal inputted from each of the cameras 41, and writes them as pixel data PD2-1 to PD2-4 into the input frame buffer 44 of each line.

Figure 5:
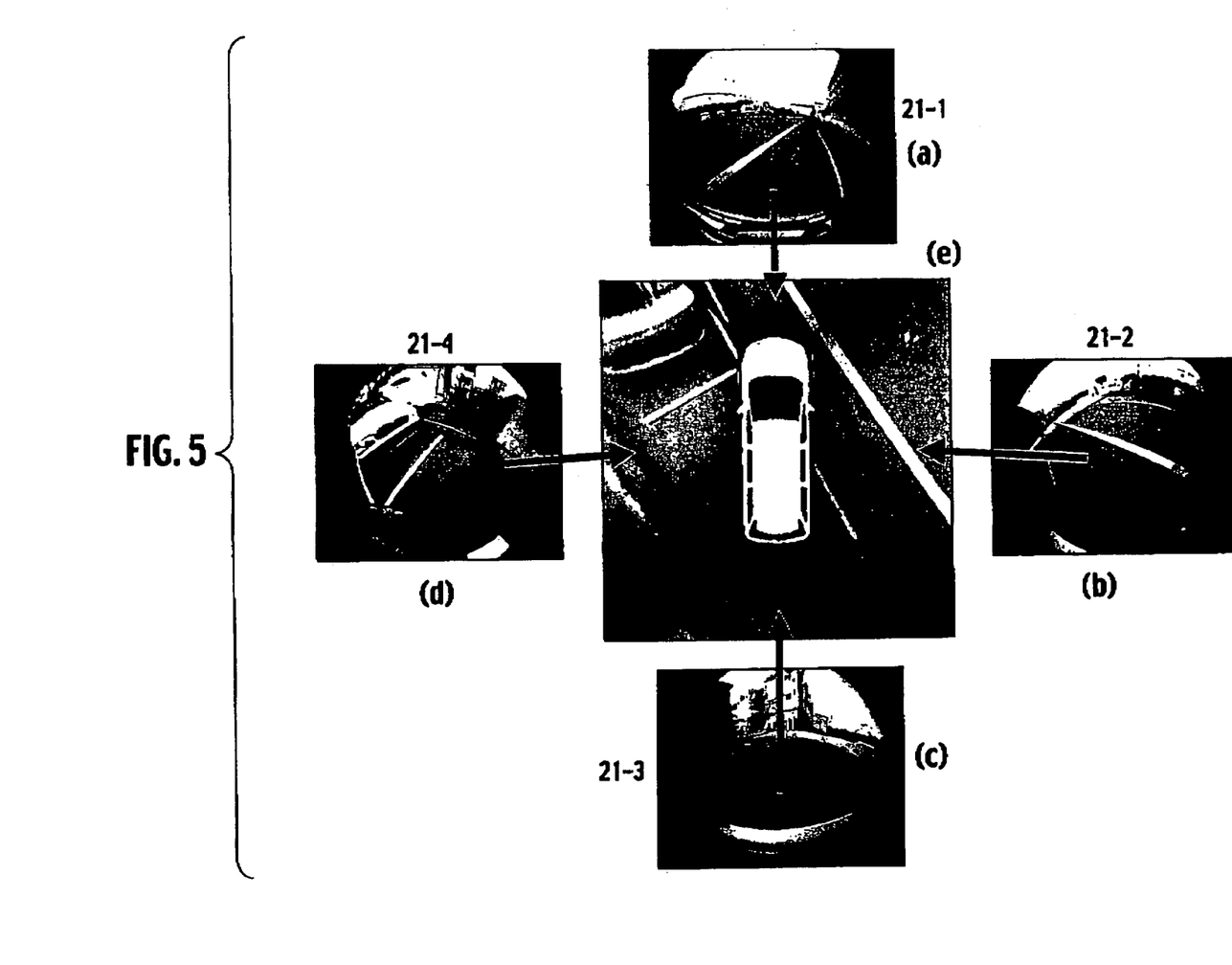
FIG. 5 illustrates an example in which an output image is generated from four input images inputted from lines 1 to 4 according to the second embodiment of the present invention.

FIG. 5 shows an example in which an output image is generated from four input images inputted from the lines 1 to 4. In FIG. 5, (a) shows an input image 21-1 of the line 1, (b) shows an input image 21-2 of the line 2, (c) shows an input image 21-3 of the line 3, (d) shows an input image 21-4 of the line 4, and (e) shows an output image.

For example, by use of the present method, as illustrated in FIG. 5, in generating the output image using a part of the each of the input images 21-1 to 21-4 from the multiple lines, calculation of brightness data B-1 to B-4 of the respective input images is completed simultaneously with the completion of the pixel data rearranging process, and the control device 45 can calculate the adjusted values AV-1 to AV-4.

This makes it possible to maintain the brightness of the image displayed by the display device 9 suitable and to improve image viewability.

As explained above, according to the present embodiment, the image generating apparatus S2 includes two or more sets of the camera 41 having the AGC function, the input frame buffer 44, which stores the image from the camera 41, the data encoder 42, which generates data to be stored in the input frame buffer 44 from the video signal VS from the camera 41, and the brightness adjusting device 43, which changes the brightness of data generated by the data encoder 42, and the control device 45, which controls multiple brightness adjusting devices 43, the rearranging device 46, which rearranges pixel data PD2 of multiple input frame buffers 44, the output frame buffer 48, which stores the result of the rearranging device 46, and the display device 49, which displays the contents of the output frame buffer 48, wherein the control device 45 controls the brightness adjusting devices 43 based on the brightness of data rearranged by the rearranging device 46.

According to this structure, even when the images inputted from the multiple cameras 41 are used as inputs and an output image is generated using a part of the respective images, an output image of suitable brightness can be obtained.

Additionally, the rearranging device 46 includes a function of measuring brightness data of the image generated in the output frame buffer 48 for each of the multiple input frame buffers 44. According to this structure, even when multiple image inputs are provided, it is possible to make a correction independently for each input.

Moreover, the rearranging device 46 may include a function of measuring an average brightness of multiple pixel data PD2 in the input frame buffer 44 used in the rearrangement for each of multiple input frame buffers 44. According to this structure, even when multiple image inputs are provided, it is possible to make a correction independently for each input.

Third Embodiment

Figure 6:
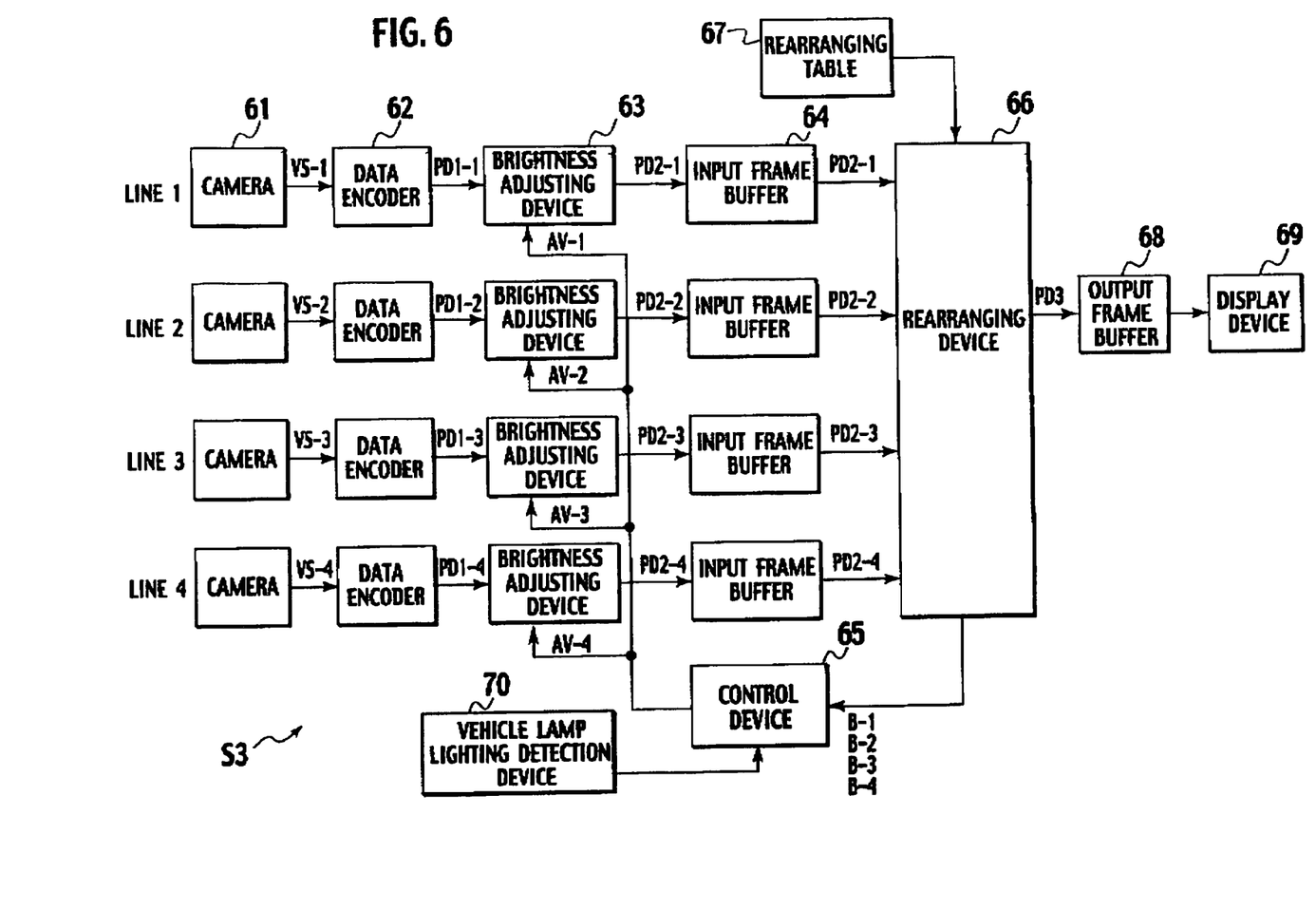
FIG. 6 is a block diagram of an image generating apparatus for a vehicle according to a third embodiment of the present invention.

As illustrated in FIG. 6, an image generating apparatus for a vehicle S3 according to a third embodiment of the present invention includes a plurality of cameras 61, a plurality of data encoders 62, a plurality of brightness adjusting devices 63, a plurality of input frame buffers 64, a control device 65, a rearranging device 66, a rearranging table 67, an output frame buffer 68, a display device 69, and a vehicle lamp lighting detection device 70.

The structure of the third embodiment is basically the same as that of FIG. 4 excepting that the vehicle lamp lighting detection device 70 is connected to the control device 65, and the operation is also the same as that of the structure of FIG. 4 excepting the point explained below.

The vehicle lamp lighting detection device 70 senses a lamp lighting operation or energization to detect which lamp of the vehicle is turned on and outputs a result to the control device 65. The control device 65 stores information of a position of each camera 61 attached to the vehicle and a position of each lamp attached to the vehicle in advance. Based on the information, the control device 65 selects a camera 61, where a lit lamp exerts an influence on the image, from a plurality of cameras 61.

Suppose that the headlamps are turned on while an image conversion such as one illustrated in FIG. 5 is performed. When the headlamps are turned on, the vehicle lamp lighting detection device 70 informs the control device 65 that the headlamps are turned on. The control device 65 judges that an influence is exerted on the image inputted from the line 1 (camera 61-1) from information of the camera position and information of the lamp position, the information being stored in the camera. The control device 65 increases the target value of the brightness, which is explained in the second embodiment, from a normal value 50 to 65 with regard exclusively to the line 1, on which an influence is exerted by the lit headlamp, and calculates an adjusted value AV-1 to be applied to the line 1. An increment in the target value may be changed according to illuminance of the lamp and the extent of its influence on the image. For example, the target value is increased by 15 when the headlamps are turned on and by 5 when blinkers are turned on. For instance, when there is no vehicle lamp lighting detection device 70 and the headlamps are turned on, the imaging range of the camera 1 is illuminated and made brighter, with the result that the target area (line 1 in this case) in the output image is controlled to be dark as a whole (i.e. the adjusted value is reduced with the target value unchanged), making it difficult to recognize, from the output image, that the headlamps are turned on. With the vehicle lamp lighting detection device 70, the lighting of the headlamps is detected and the target value of the brightness data of the target area is set to be higher. This makes it possible to increase the adjusted value, so that the lighting of the headlamps can be recognized also from the output image. And a more natural output image is obtained.

As mentioned above, according to the present embodiment, the control device 65 includes the vehicle lamp lighting detection device 70 that detects the lighting of the vehicle lamp, and the output (adjusted value) of the control device 65 is changed by the output of the vehicle lamp lighting detection device 70. According to this structure, the control device 65 detects the lighting of the vehicle lamps to make it possible to judge an area illuminated by the lamps in the images of the areas around the vehicle and adjust the brightness of the image corresponding to the relevant area based on the judgment, and thereby a natural output image is provided by a control of displaying more brightly the images of the area illuminated by the lit lamps.

Also, the control device 65 can change the target value of the brightness data to be used in a brightness adjustment control within the control device 65, according to the output of the vehicle lamp lighting detection device 70. According to this structure, the control device 65 changes the target value for the brightness adjustment in accordance with the lighting situation of the vehicle lamp, and thereby a natural output image is provided by a control of displaying more brightly the images of the area illuminated by the lit lamps.

The preferred embodiments described herein are illustrative and hot restrictive, and the invention may be practiced or embodied in other ways without departing from the spirits or essential characters thereof. The scope of the invention being indicated by the claims, and all variations which come within the meaning of claims are intended to be embraced herein.

The present disclosure relates to subject matters contained in Japanese Patent Application No. 2005-128868, filed on Apr. 27, 2005, the disclosures of which is expressly incorporated herein by reference in its entirety.

What is claimed is:

1. An image generating apparatus for a vehicle comprising:
   a camera;
   a brightness adjusting device which adjusts brightness of pixel data obtained by encoding a video signal from the camera;
   an input frame buffer that stores the pixel data adjusted by the brightness adjusting device;
   a rearranging device that rearranges a part of the pixel data which is stored in the input frame buffer and has been adjusted by the brightness adjusting device;
   an output frame buffer that stores the pixel data rearranged by the rearranging device; and
   a control device that controls the brightness adjusting device, wherein the brightness adjusting device is controlled to adjust the brightness of the pixel data based on brightness of the pixel data which is stored in the output frame buffer or the brightness of the part of the pixel data which is stored in the input frame buffer.

2. The image generating apparatus for a vehicle according to claim 1, further comprising:
   a data encoder that encodes the video signal from the camera to generate the pixel data; and
   a display device that generates an output image from the pixel data stored in the output frame buffer and displays the output image,
   wherein the camera is a camera having an AGC function.

3. The image generating apparatus for a vehicle according to claim 2, wherein two or more sets of the camera, the input frame buffer, the data encoder and the brightness adjusting device are provided; the control device collectively controls the plurality of the brightness adjusting devices; and the rearranging device collectively rearranges the pixel data in the plurality of input frame buffers.

4. The image generating apparatus for a vehicle according to claim 2, wherein the control device takes an average value of the brightness of the pixel data stored in the output frame buffer as an input.

5. The image generating apparatus for a vehicle according to claim 3, wherein the control device takes an average value of the brightness of the pixel data stored in the output frame buffer as an input.

6. The image generating apparatus for a vehicle according to claim 2, wherein the control device takes an average value of the brightness of the pixel data used in rearrangement by the rearranging device, which are stored in the input frame buffer, as an input.

7. The image generating apparatus for a vehicle according to claim 3, wherein the control device takes an average value of the brightness of the pixel data used in rearrangement by the rearranging device, which are stored in the input frame buffer, as an input.

8. The image generating apparatus for a vehicle according to claim 2, wherein the brightness adjusting device has two kinds of independent correction functions including a fixed brightness correction corresponding to a pixel position and a brightness correction made by the control device, and the brightness of the pixel data generated by the data encoder is changed by a relevant correction function to store corrected pixel data in the input frame buffer.

9. The image generating apparatus for a vehicle according to claim 8, wherein the rearranging device has a function of measuring an average value of the brightness of the pixel data stored in the output frame buffer.

10. The image generating apparatus for a vehicle according to claim 6, wherein the rearranging device has a function of measuring an average value of the brightness of the pixel data used in rearrangement, which are stored in the input frame buffer.

11. The image generating apparatus for a vehicle according to claim 7, wherein the rearranging device has a function of measuring an average value of the brightness of the pixel data used in rearrangement, which are stored in the input frame buffer.

12. The image generating apparatus for a vehicle according to claim 5, wherein the rearranging device has a function of measuring, for each of the multiple input frame buffers, an average value of the brightness of the pixel data stored in the output frame buffer.

13. The image generating apparatus for a vehicle according to claim 7, wherein the rearranging device has a function of measuring, for each of the multiple input frame buffers, an average value of the brightness of the pixel data stored in the input frame buffer used in rearrangement.

14. The image generating apparatus for a vehicle according to claim 3, further comprising: a vehicle lamp lighting detection device that detects lighting of a vehicle lamp, wherein the control device controls the multiple brightness adjusting devices based on an output of the vehicle lamp lighting detection device.

15. The image generating apparatus for a vehicle according to claim 14, wherein the control device changes a target value used in the control according to the output of the vehicle lamp lighting detection device.

16. An image generating method for a vehicle comprising:
encoding a video signal from a camera to generate pixel data;
performing a brightness adjustment for adjusting brightness of the generated pixel data;
storing the pixel data whose brightness is adjusted by the brightness adjustment;
rearranging a part of the stored pixel data whose brightness has been adjusted by the brightness adjustment;
storing the rearranged pixel data; and
generating an output image from the rearranged pixel data to display the generated output image;
further comprising controlling the performing for the brightness adjustment so as to perform the brightness adjustment based on the brightness of the rearranged pixel data or the brightness of the part of the pixel data which is stored before the rearranging step.

* * * * *